(12) United States Patent
Johnson et al.

(10) Patent No.: US 6,754,755 B1
(45) Date of Patent: Jun. 22, 2004

(54) SERVICE REQUEST SYSTEM USING AN ACTIVITY INDICATOR TO REDUCE PROCESSING OVERHEAD

(75) Inventors: Scott C. Johnson, Williamson County, TX (US); Rodney S. Canion, Williamson County, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 497 days.

(21) Appl. No.: 09/717,667

(22) Filed: Nov. 21, 2000

Related U.S. Application Data

(63) Continuation-in-part of application No. 09/637,265, filed on Aug. 10, 2000.

(51) Int. Cl.$^7$ .................................................. G06F 9/48
(52) U.S. Cl. ........................ 710/262; 710/260; 709/223
(58) Field of Search ................................. 710/260–264, 710/240–244; 709/225, 250, 301

(56) References Cited

U.S. PATENT DOCUMENTS

| | | | | |
|---|---|---|---|---|
| 3,943,495 A | * | 3/1976 | Garlic | 711/220 |
| 4,247,758 A | * | 1/1981 | Rodrian | 377/6 |
| 4,901,232 A | * | 2/1990 | Harrington et al. | 710/6 |
| 5,530,874 A | * | 6/1996 | Emery et al. | 710/262 |
| 5,918,028 A | * | 6/1999 | Silverthorn et al. | 710/306 |
| 6,003,109 A | * | 12/1999 | Caldwell et al. | 710/262 |
| 6,012,121 A | * | 1/2000 | Govindaraju et al. | 710/260 |
| 6,067,407 A | * | 5/2000 | Wadsworth et al. | 709/224 |
| 6,115,776 A | * | 9/2000 | Reid et al. | 710/260 |
| 6,314,480 B1 | * | 11/2001 | Nemazie et al. | 710/74 |
| 6,351,785 B1 | * | 2/2002 | Chen et al. | 710/263 |
| 6,370,607 B1 | * | 4/2002 | Williams et al. | 710/262 |
| 6,434,651 B1 | * | 8/2002 | Gentry, Jr. | 710/260 |
| 6,453,360 B1 | * | 9/2002 | Muller et al. | 709/250 |

FOREIGN PATENT DOCUMENTS

| | | | | |
|---|---|---|---|---|
| EP | 0 621 535 A2 | * | 4/1994 | G06F/9/46 |

OTHER PUBLICATIONS

"Structured Computer Organization" Third Edition, Andrew S. Tanenbau, 1990 pp. 11–13.*

* cited by examiner

*Primary Examiner*—Paul R. Myers

(57) ABSTRACT

A service request system for a subsystem of a computer including a processor, a driver, and inhibit logic. The inhibit logic detects requests for service by the subsystem and asserts an interrupt unless the driver is executing and servicing the subsystem. The driver is executed by the processor in response to the interrupt to service the subsystem, where the driver controls the inhibit logic to prevent interrupts associated with the subsystem from being asserted while the driver is being executed by the processor. In this manner, redundant interrupts or service requests initiated by the subsystem are eliminated. The service request system may include an activity indicator that indicates whether the driver is being executed. Th inhibit logic asserts an interrupt in response to a service request from the subsystem unless the activity indicator indicates that the driver is in control of the processor. The subsystem may further detect the activity indicator and inhibit requesting service while the activity indicator indicates that the driver is active. In this manner, the subsystem avoids wasting time associated with requesting service. Also, the subsystem may be operated in a more streamlined mode while the driver is in control of the processor. In one embodiment, the activity indicator is a logic bit, where the driver changes the state of the logic bit upon execution to a first state and changes the state of the logic bit to a second state upon exiting.

18 Claims, 6 Drawing Sheets

SERVICE REQUEST SYSTEM USING AN ACTIVITY INDICATOR TO REDUCE PROCESSING OVERHEAD

CROSS-REFERENCE TO RELATED APPLICATION

The present application is a continuation in part of U.S. patent application Ser. No. 09/637,265, filed Aug. 10, 2000, entitled "A Service Request System Using an Activity Indicator to Reduce Processing Overhead," which is hereby incorporated by reference herein in its entirety.

FIELD OF THE INVENTION

The present invention relates to requesting services of a processor of a computer, and more particularly to a system and method for servicing requests using an activity indicator in order to reduce process overhead.

DESCRIPTION OF THE RELATED ART

Computers typically include several subsystems that perform one or more predetermined functions, such as functions associated with data transfer, communications, data processing, etc. It is often desired to inform a computer's processor or central processing unit (CPU) to perform processing associated with one or more of the subsystem functions. Many such functions are repetitive and occur relatively often, so that the CPU may be interrupted relatively often by the same subsystem. Since CPU technology has advanced significantly, the CPU was usually able to respond and complete the interrupt task before another interrupt by the same subsystem. Technology associated with many subsystems, however, has also advanced so that the CPU may be interrupted again by the same subsystem logic that the CPU is currently servicing. When the CPU is executing a driver in response to an interrupt by a subsystem, another interrupt by that same subsystem causes the CPU to waste valuable processor time responding to redundant interrupts.

One exemplary subsystem is network communications such as performed by a network adapter card or network interface controller (NIC). Using such adapters or controllers, computers and other devices may be networked together using any one of several available architectures and any one of several corresponding and compatible network protocols. A common network architecture is Ethernet™, such as the 10Base-T Standard operating at 10 Megabits per second (Mbps) and 100Base-TX Ethernet™ Standard operating at 100 Mbps according to the IEEE Standard 802.3. A newer Ethernet™ architecture operating at 1 Gigabit per second (Gbps) is available and becoming more prominent for server systems. The present invention is illustrated using the Ethernet™ architecture which may be used with TCP/IP (Transmission Control Protocol/Internet Protocol), which is a common network protocol particularly for the Internet. The present invention, however, is not limited to any particular network protocol or architecture. In fact, although the present invention is illustrated using network type communication systems, it is not limited to network communications and may be applied to any type of subsystem of a computer.

The primary function of a network adapter is to transfer data to and from system memory of the computer system, although the network adapter may perform many other network functions. A network may have its own processor or processing logic, but many network functions may still require processing by the CPU or may require CPU notification. For example, in many configurations, a network adapter informs the CPU after every network packet is received before Direct Memory Access (DMA) circuitry or the like on the network adapter transfers the data to the system memory. After transferring data from the network to the computer system memory, the computer CPU may be needed to process the transferred data in the system memory. In a similar manner, when data is transferred from the system memory to the network adapter or asserted onto the network, the network adapter may inform the CPU that the transfer has completed.

A driver or interrupt service routine (ISR) that corresponds to the network adapter is loaded into the memory and executed by the processor or CPU in response to interrupts by the network adapter. The network adapter sends an interrupt to the CPU after each packet is received, so that the CPU executes the driver or ISR in response to each interrupt. While the CPU is executing the driver in response to an interrupt from a network adapter in response to a received packet, another packet may be received by the same network adapter, which asserts another interrupt. The CPU responds to the new interrupt wasting valuable processing time and causing significant delay. Such delays cause inefficiency of the subsystem, which may affect the overall performance of the computer system.

One or more computers in a network configuration may operate as servers for other computers and devices in the network. Often, the other computers and devices rely on the server(s) for information, storage, access to databases, programs, other networks, etc., and various other services. It is desired to improve network processing between a network adapter and its host computer for any computer coupled to a network. This is particularly true when the computer operates as a server on the network. It is desired that each server operate as efficiently as possible and to provide as much data bandwidth as possible, especially during periods of heavy demand and increased network traffic. More generally, it is desired to improve the efficiency of processing associated with any type of subsystem of a computer.

SUMMARY OF THE INVENTION

A service request system for a subsystem of a computer includes a processor, a driver, and inhibit logic that detects requests for service by the subsystem and that asserts an interrupt unless the driver is executing and servicing the subsystem. The driver is executed by the processor in response to the interrupt to service the subsystem, where the driver controls the inhibit logic to prevent interrupts associated with the subsystem from being asserted while the driver is being executed by the processor. In this manner, redundant interrupts or service requests initiated by the subsystem are eliminated thereby avoiding unnecessary processing overhead associated with handling such redundant interrupts or service requests.

The service request system may include an activity indicator that indicates whether the driver is being executed. The inhibit logic asserts an interrupt in response to a request by the subsystem unless the driver is executing as indicated by the activity indicator. Also, the driver controls the activity indicator to prevent redundant interrupts associated with the subsystem. In another embodiment, the subsystem detects the activity indicator and inhibits requesting service while the activity indicator indicates that the driver is being executed by the processor. In this latter case, the subsystem avoids wasting time associated with requesting service.

Further, the subsystem may be operated in a more streamlined mode while the driver is in control of the processor.

In one embodiment, the activity indicator is a logic bit that indicates whether the driver is executing. The driver changes the state of the logic bit upon execution to a first state and changes the state of the logic bit to a second state upon exiting. For example, an "inactive" bit is cleared by the driver upon execution and set by the driver when exiting execution.

A computer system according to one embodiment of the present invention includes at least one peripheral bus, a disk drive and corresponding disk drive controller, a processor, a system memory, a subsystem, and a subsystem driver. The subsystem includes subsystem logic that requests service from the processor and interrupt logic that selectively asserts an interrupt in response to requests for service from the subsystem logic. The subsystem driver is executed by the processor from the system memory in response to an interrupt from the subsystem interrupt logic. The subsystem driver controls the subsystem interrupt logic to prevent interrupts associated with the subsystem logic while the subsystem driver is being executed by the processor.

In one embodiment, the subsystem is coupled to the processor via the peripheral bus. For example, the subsystem may be implemented on a network interface card (NIC) that is plugged into a slot of the peripheral bus. In this case, the subsystem logic may comprise network logic on the NIC that performs network functions for coupling the computer system to a network, and the driver may comprise a NIC driver for handling requests for service by the NIC. In this case, redundant interrupts from the NIC are avoided while the NIC driver is servicing the NIC.

The computer system may include system interrupt logic that receives interrupts for the processor, that interrupts the processor for each interrupt received and that informs the processor of the source of each received interrupt. The computer system may further include an activity indicator, where the subsystem interrupt logic selectively asserts an interrupt in response to a request from the subsystem logic based on the activity indicator. The subsystem driver controls the activity indicator to prevent interrupts associated with the subsystem logic while the subsystem driver is being executed by the processor. In a more particular embodiment, the activity indicator is a logic bit (such as an "active" bit, an "inactive" bit, an "activity" bit, etc.) that indicates whether the subsystem driver is being executed by the processor. In this latter case, the subsystem driver changes the logic bit to a first state during initial execution and changes the logic bit to a second state prior to exiting execution. For an inactive bit representing whether the driver is being executed (active, logic zero) or not being executed (inactive, logic one), the subsystem driver clears the inactive bit upon execution and sets the bit just before exiting.

A method of handling service requests for a processor of a computer according to one embodiment of the present invention includes detecting a service request, selectively asserting a corresponding interrupt in response to the service request based on the status of an activity indicator, executing a driver in response to an interrupt, and controlling, by the driver, the activity indicator to prevent further interrupts while the driver is being executed and to enable interrupts while the driver is not being executed. The activity indicator may comprise an activity bit, where the selectively asserting a corresponding interrupt includes asserting an interrupt if the activity indicator is in a first logic state, and inhibiting an interrupt if the activity indicator is in a second logic state. The method may further include setting, by the driver, the activity bit during execution and clearing, by the driver, the activity bit prior to exiting execution. For a computer that includes subsystem logic that requests service, the method further may further include selectively requesting service, by the subsystem logic, based on the status of the activity indicator.

It is now appreciated that a system and method using an activity indicator to reduce processing overhead according to the present invention reduces process overhead associated with redundant interrupts and/or service requests. A system and method according to the present invention is advantageous for any computer in which a subsystem may potentially assert an interrupt while its own driver or interrupt service routine is already in control of the system processor. The driver associated with a subsystem handles one or more serviceable functions or events while in control of the system processor, so that the processor need not spend valuable processing time responding to any redundant interrupts or requests. Such redundant requests are avoided, thereby improving overall system efficiency by eliminating unnecessary process overhead.

A network controller system with interrupt inhibits according to the present invention improves network processing between a network adapter or NIC and its host computer by eliminating redundant interrupts from the NIC. Such a network controller system is particularly useful on network server systems. Data flow between the network adapter and host computer memory, for example, is processed much more quickly, thereby significantly increasing bandwidth and improving network traffic flow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
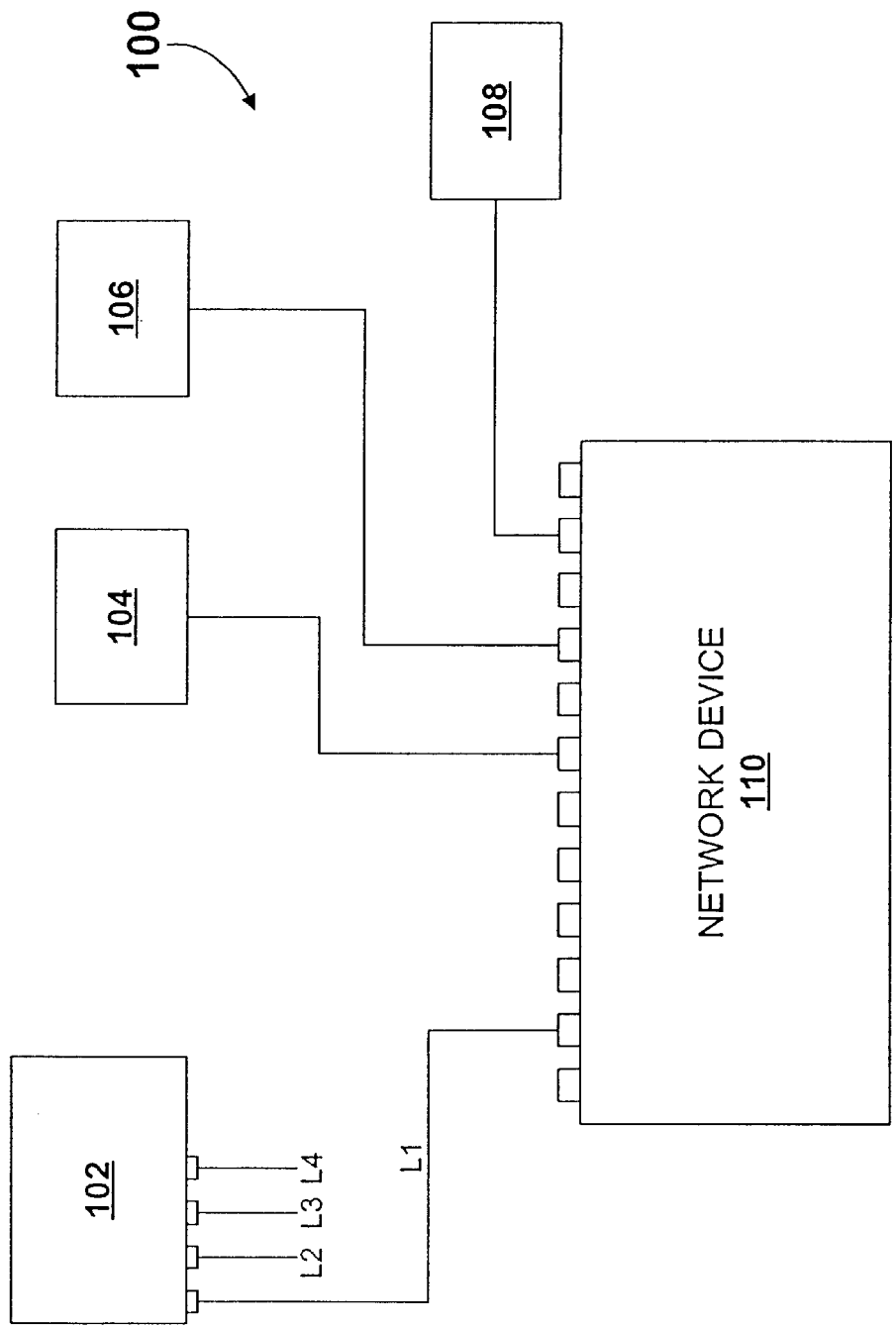
FIG. 1 is a block diagram of a network that enables a computer system implemented according to one embodiment of the present invention to communicate with one or more other devices.

Referring now to FIG. 1, a block diagram is shown of a network 100 that enables a computer system 102 to communicate with one or more other devices, such as devices 104, 106 and 108 as shown. The devices 104, 106 and 108 may be of any type, such as another computer system, a printer or other peripheral device, or any type of network device, such as a hub, a repeater, a router, a brouter, etc. The computer system 102 and the devices 104–108 are communicatively coupled together through a multiple port network device 110, such as a hub, repeater, bridge or switch, where each of the devices 104–108 is coupled to one or more respective ports of the network device 102. The network 100, including the network device 110, the computer system 102 and each of the devices 104–108, may operate according to any type of network architecture, such as Ethernet™, Token Ring, etc., or combinations of such architectures. In the embodiment shown, the network 100 operates according to Ethernet™, such as such as 10BaseT at 10 Megabits per second (Mbps), 100BaseTX at 100 Mbps, or 1 Gigabits per second (1 Gbps) Ethernet™. The network 100 may form any type of Local Area Network (LAN) or Wide Area Network (WAN), and may comprise an intranet and be connected to the Internet. For example, the device 108 may comprise a router that connects to an Internet provider.

The computer system 102 includes one or more adapter cards or network interface cards (NICs) to implement one or more network ports to enable the computer system to communicate on the network 100. As shown, for example, the computer system 102 includes multiple NICs, each with at least one corresponding port to enable communication via corresponding links L1, L2, L3 and L4. It is noted that a single NIC may be multi-headed and thus include multiple ports. The computer system 102 is coupled to the network device 110 via at least one link L1. The other links L2–L4 may be coupled to the network device 110, other data devices similar to the devices 104–108, or other network devices similar to the network device 110, as desired.

In the exemplary embodiment shown, the network 100 conforms to an Ethernet™ standard operating at 10 or 100 Mbps or 1 Gbps, although other network architectures are contemplated, such as Token Ring, Token Bus, ATM (Asynchronous Transfer Mode), etc. Ethernet™ is a packet-switched configuration in which messages are transmitted using variable length frames from 72 to 1518 bytes in length. Each packet or frame contains a header with the addresses of the source and destination stations or data devices and a trailer that contains error correction data. Higher-level protocols, such as IP (Internet Protocol) and IPX (Internetwork Packet eXchange), fragment long messages into the frame size required by the Ethernet™ network being employed. In contrast, ATM uses a cell-switched configuration in which all traffic is transmitted as fixed-length, 53 byte cells.

Figure 2:
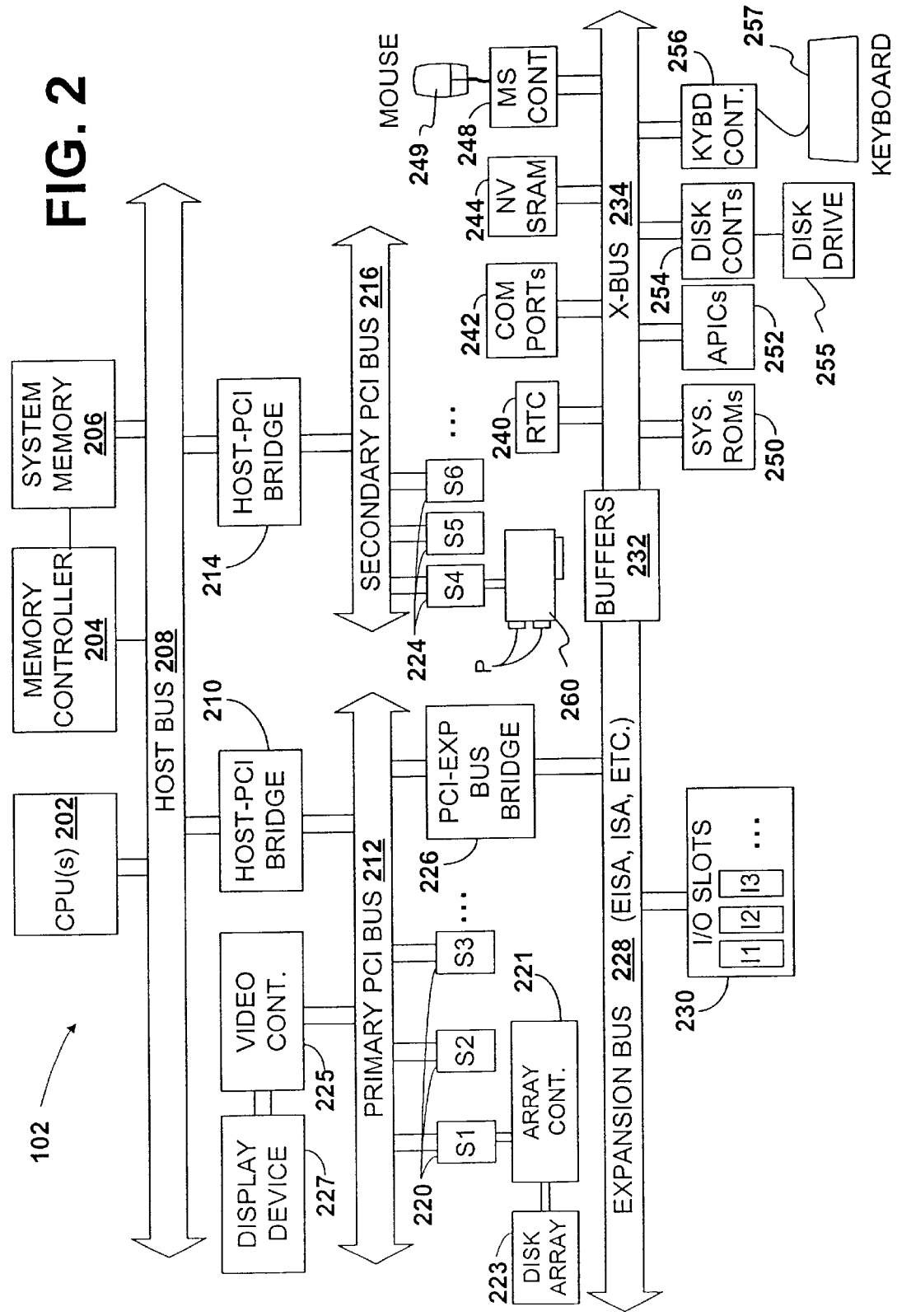
FIG. 2 is a system block diagram of an exemplary configuration of the computer system of FIG. 1.

Referring now to FIG. 2, a system block diagram is shown of an exemplary configuration of the computer system 102 incorporating a network controller system implemented according to the present invention. The computer system 102 is preferably an IBM-compatible, high-end personal computer (PC) system or the like typically used for workstations or server systems, although any type of desktop, portable or laptop computer is also contemplated. Although the present invention is illustrated using an IBM-compatible type computer system, it is understood that the present invention is applicable to other types of computer systems as known to those skilled in the art. The computer system 102 includes a host bus 208, which is coupled to one or more central processing units (CPUs) 202. Only one CPU 202 is shown, though it is understood that a multiprocessor computer system is also contemplated. The CPU 202 may include an appropriate processor and supporting circuitry, such as the 80486, Pentium™, or Pentium II™, etc. microprocessors from Intel Corp., although other types of processors are contemplated, such as the K6 microprocessor by Advanced Micro Devices. The external circuitry preferably includes an external or level two (L2) cache or the like (not shown). A memory controller 204 is coupled to the host bus 208 for interfacing system memory 206. The system memory 206 is preferably implemented with one or more memory boards plugged into compatible memory slots on the motherboard of the computer system 102.

The computer system 102 may include one or more peripheral, expansion, input/output (I/O) buses, etc. as desired. For example, the exemplary configuration includes a primary PCI bus 212 coupled to the host bus 208 via a Host-PCI bridge 210. The primary PCI bus 212 is typically implemented with one or more PCI slots 220, individually labeled S1, S2, S3, and so on. Each of the PCI slots 220 are configured to receive compatible PCI adapter cards incorporating one or more PCI devices as known to those skilled in the art. Typical PCI devices include network interface cards (NICs), disk controllers such as a SCSI (small computer systems interface) disk controller, video or graphics controllers, etc. In the exemplary configuration shown, for example, an array controller 221 is plugged into the slot S1 for coupling a disk array 223 of hard drives. One or more integrated PCI devices may also be included, which are typically integrated onto the motherboard itself and coupled directly to the primary PCI bus 212. In the exemplary configuration shown, for example, an integrated video controller 225 is coupled to PC bus 212 for coupling to a display device 227, such as a monitor or any other type of output visual device for computer systems.

A secondary PCI bus 216 may also be provided and coupled to the host bus 208 through another Host-PCI bridge 214. The secondary PCI bus 216 is provided for further PCI expansion capability and includes one or more slots 224, which are consecutively numbered above the PCI slots S1–S3, such as PCI slots S4, S5, S6, etc. Although only six (6) PCI slots are shown, more PCI slots may be added to either PCI bus 212, 216 as needed or desired. Since the PCI buses 212 and 216 are both relatively independent and coupled through the host bus 208, they are referred to as "peer" PCI buses with respect to each other. Additional host peer PCI buses may be provided on the motherboard and coupled to the host bus 208 as desired. Each of the host peer PCI buses, such as the PCI buses 212 and 216 shown, may include one or more subordinate PCI buses as known to those skilled in the art. Subordinate PCI buses may be incorporated directly on the motherboard, but are usually provided on PCI adapter cards plugged into any one or more of the PCI slots S1–S6.

The computer system 102 includes an expansion bus 228 coupled to the primary PCI bus 228 through a PCI-Expansion bus bridge 226. The expansion bus 228 is any one of many different types, including the industry standard architecture (ISA) bus, the extended industry standard architecture (EISA) bus, the microchannel architecture (MCA) bus, etc. For high-end PC systems, the EISA bus provides greater performance, where the PCI-expansion bus bridge 226 is a PCI-EISA bridge. The expansion bus 228 preferably includes one or more expansion or input/output (I/O) slots 230, individually labeled I1, I2, I3, etc. Various devices incorporated on I/O adapter cards may be coupled to the expansion bus 228 through the I/O slots 230, including expansion bus memory, modems, disk controllers, sound cards, NICs and various other types of controllers as known to those skilled in the art.

The expansion bus 228 also couples to a peripheral expansion bus referred to as the X-bus 234 through a set of bus buffers 232. The X-bus 234 is used for connecting various system components and peripherals to the computer system 102, such as system read only memories (ROMs) 250 comprising one or more ROM modules, one or more APICs (advanced programmable interrupt controllers) 252, one or more disk controllers 254 (such as a floppy disk controller (FDC) and a hard disk controller (HDC)) for coupling corresponding floppy or hard disk drives 255, a keyboard controller 256 for coupling a keyboard 257, a real time clock (RTC) and timers 240, communication ports 242, non-volatile static random access memory (NVSRAM) 244, a mouse controller 248 for coupling a mouse 249, as well as other peripherals not shown, such as a direct memory access (DMA) system, diagnostics ports, command/status registers, battery-backed CMOS memory, etc.

In the exemplary embodiment shown, a NIC 260 is plugged into the PCI slot S4 of the secondary PCI bus 216 for enabling the computer system 102 to couple to and communicate with a comparable network, such as the network 100 shown in FIG. 1. The NIC 260 is shown with 2 network ports (P), although any number of ports may be included on the NIC 260 as desired and a single port NIC is also contemplated. For the network 100, the NIC 260 enables the computer system 102 to connect to the network device 110 via the link L1 as shown in FIG. 1. It is noted that the present invention is not limited to a NIC configuration, but also contemplates a network system integrated into a computer system, such as on the motherboard of the computer system 102.

Figure 3:
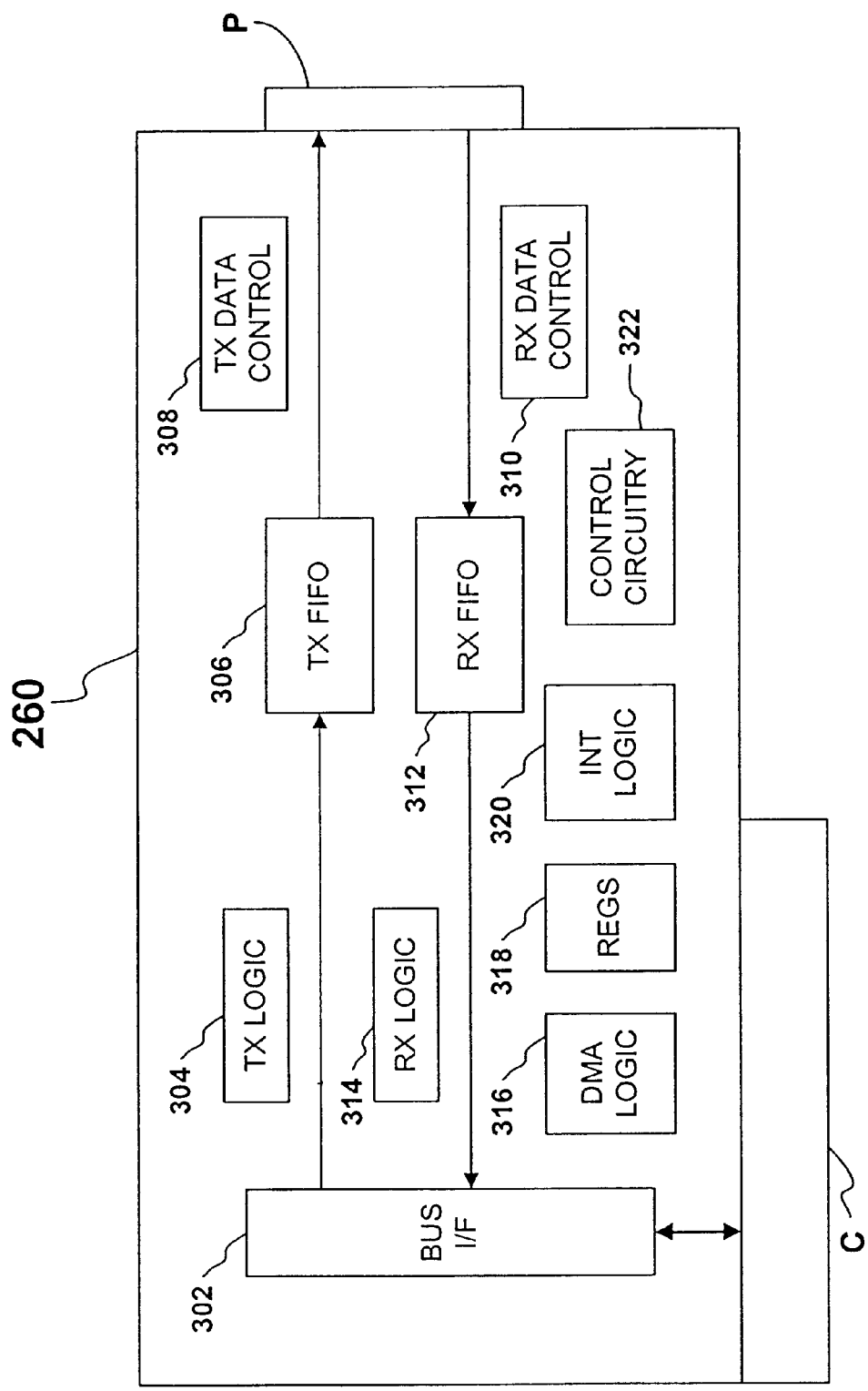
FIG. 3 is a block diagram of an exemplary configuration of the network interface card (NIC) of FIG. 2.

FIG. 3 is a block diagram of an exemplary configuration of the NIC 260. The NIC 260 includes a connector C that is configured to plug into a corresponding slot of a bus of the computer system 102, such as a PCI slot of one of the PCI buses 212m 216. The NIC 260 includes one or more ports P for enabling the computer system 102 to couple to and communicate with a comparable network, such as the network 100 as previously described. Only one port P is shown for simplicity, although any number of ports may be included. The NIC 260 includes a bus interface (I/F) 302 for mechanically and electrically interfacing an appropriate bus of the host computer system. For PCI, the bus I/F 302 comprises a PCI bus interface with 32–64 address and 32–64 data bits and a clock rate of 33 to 66 MHz.

Transmit data is transferred from host memory, such as from the system memory 206, via the connector C and the bus I/F 302 to a TX FIFO (First In First Out memory data buffer) 306 by DMA logic 316 as controlled by TX logic 304. In one embodiment, the TX logic 304 cooperates with a corresponding driver 414 (FIG. 4) executed on the computer system 102 for the NIC 260 to maintain a transmit descriptor array (not shown) in the system memory 206. The TX logic 304 includes a TX list engine (not shown) that coordinates data flow from the system memory 206 to the TX FIFO 306. When data is available in the system memory 206 and the TX FIFO 306 has available buffers, the TX logic 304 queues a transfer request to the DMA logic 316, which eventually performs the transmit data transfer. Transmit data in the TX FIFO 304 is transferred to the port P and asserted on the coupled network under control of TX data control 308.

Receive data from the network via port P is provided to an RX FIFO 312 under control of an RX data control 310. The receive data from the RX FIFO 312 is transferred to the system memory 206 via the connector C and the bus I/F 302 by the DMA logic 316 as controlled by RX logic 314. In one embodiment, the RX logic 314 cooperates with the corresponding driver, such as the driver 414, to maintain a receive descriptor array (not shown) in the system memory 206. The RX logic 314 includes a RX list engine (not shown) that coordinates data flow from the RX FIFO 312 to the system memory 206. When there is receive data in the RX FIFO 312 and there is corresponding space in the system memory 206, the RX logic 314 queues a transfer request to the DMA logic 316, which performs the receive data transfer.

The NIC 260 also includes other supporting logic and circuitry, such as a plurality of registers (REGS) 318, interrupt logic 320 and control circuitry 322. The control circuitry 322 may include a processor or microprocessor for controlling various functions of the NIC 260. The interrupt logic 320 primarily functions to interrupt a host processor, such as the CPU 202 of the computer system 102, to request service for the NIC 260. The CPU 202 responds by executing an appropriate interrupt service routine (ISR), such as a driver configured for the NIC 260 (e.g. the driver 414) to handle the functions indicated by the interrupt. The present invention generally involves the timing of an interrupt signal asserted by the interrupt logic 320, as further described below.

Figure 4:
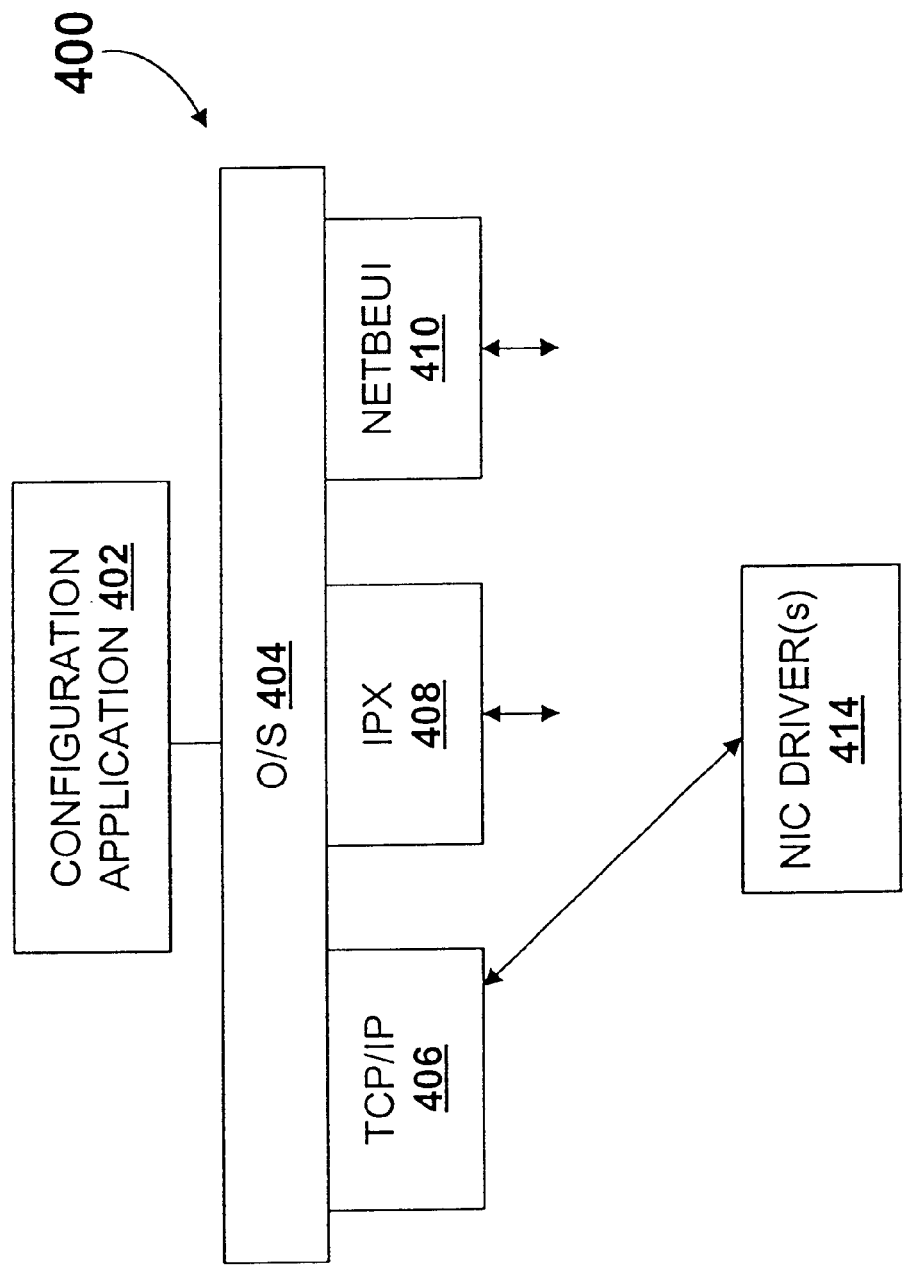
FIG. 4 is a block diagram of an exemplary controller software system installed on the computer system of FIG. 1 to communicatively interface the NIC of FIG. 2.

FIG. 4 is a block diagram of an exemplary controller software system 400 installed on the computer system 102. One or more NIC drivers 414 are installed on the computer system 102, each for supporting and enabling communications with a respective port of the NIC 260. The computer system 102 is installed with an appropriate operating system (O/S) 404 that supports networking, such as Microsoft NT, Novell Netware, or any other suitable network operating system. The O/S 404 includes, supports or is otherwise loaded with the appropriate software and code to support one or more communication protocols, such as TCP/IP (Transmission Control Protocol/Internet Protocol) 406, IPX (Internet Protocol eXchange) 408, NetBEUI (NETwork BIOS End User Interface) 410, etc. Each protocol binds with one or more NIC drivers to establish a communication link between a computer, such as the computer system 102, and a network, such as the network 100, that is supported by the bound NIC, such as the NIC 260. In general, binding a NIC port associates a particular communication protocol with the NIC driver and enables an exchange of their entry points. As shown in FIG. 4, the TCP/IP protocol 406 is bound to the NIC driver 414.

A configuration application 402 is also included that interfaces with the operating system 404 to enable a user of the computer system 102 to configure the mode of operation of the NIC 260 via one or more input devices, such as the mouse 249 and the keyboard 257, and one or more output devices, such as the display device 227.

The NIC 260 receives network data from the network 100 and transfers received data to the system memory 206, typically using a direct memory access DMA method that does not require involvement of the CPU 202. While a message is being transferred or after the message is transferred from the NIC 260 to the system memory 206, the interrupt logic 320 of the NIC 260 generates an interrupt to the CPU 202 to process the message. In a similar manner, after the NIC 260 transfers an out-going message from the system memory 206 to the NIC 260 and onto the network 100 via the link L1, the NIC 260 asserts a transmit acknowledge interrupt to the CPU 202. In the exemplary configuration shown, the APICs 252 are used to handle interrupts to the CPU 202. Thus, any interrupts from the NIC 260 are transferred via the PCI buses 216, 212, the host bus 208, the expansion bus 228 and the X-bus 234 and corresponding bridges 214, 210, 226 and the buffers 232. The APICs 252 then inform the CPU 202 of the interrupt and source of the interrupt, and the CPU 202 executes an ISR associated with the NIC 260.

The ISR is generally in the form of, or part of, a software driver or the like configured for a particular NIC. In the exemplary embodiment shown, the NIC driver 414 is configured to operate with at least one port of the NIC 260, and is executed by the CPU 202 from the system memory 206. The CPU 202 executing the NIC software driver 414 is collectively considered the "processing logic" that is used to service or processes network events and functions in response to interrupts originated by the NIC 260.

The time from when the interrupt is asserted by the NIC 260 to when the processing logic handles the interrupt is referred to as the interrupt latency. The interrupt latency may significantly affect the overall efficiency of the computer system 102 and of processing network communications. One possible solution is to move the NIC 260 to the primary PCI bus 212 in an attempt to reduce the path to the APICs 252 and thus the interrupt latency. The affect on the interrupt latency may depend, however, on the traffic of the primary PCI bus 212. The array controller 221 and disk array 223 may cause the latency to increase rather than decrease or to not be significantly affected.

Another possible solution is to determine an approximate interrupt latency period of the computer system 102 on the network 100 and cause the interrupt logic 320 of the NIC 260 to assert the interrupt early by the approximate latency period. For example, during a receive operation, the NIC 260 receives a packet from the network 100 and begins transferring the packet to the system memory 206. Normally, a NIC waits until the packet is completely transferred to the system memory before asserting an interrupt. For an "early interrupt" the NIC 260 calculates an approximate time, called the packet transfer time, for the packet to be completely transferred to the system memory 206 using the packet size and a measured or determined transfer rate. The NIC 260 subtracts the latency period from the packet transfer time to determine a delay time after the start of the packet transfer. The NIC 260 asserts the interrupt early, after the expiration of the delay time, in an attempt to have the processing logic begin handling the interrupt at approximately the same time that the packet transfer is completed.

Efficiency may be improved with early interrupts even if the processing logic is late, since a certain amount of the interrupt latency occurs in parallel with the packet transfer. Efficiency is maximized if the processing logic begins responding at the same time that the packet transfer completes. For example, if the processing logic is too early, inefficiency may result since the CPU 202 is unable to do any other processing while waiting for the transfer to complete. Thus, an early interrupt may cause wasted CPU time. If the processing logic terminates the suspended interrupt handling routine to resume other processing, a substantial inefficiency results since the CPU time is completely wasted during the failed interrupt and the CPU 202 must be interrupted again (or execute the software driver again) to process the received packet.

During relatively slow network traffic conditions, the network traffic is generally serial in nature in which a packet is often sent in response to a packet before another packet is received. During such slow, serial traffic conditions, early interrupts using a fixed estimate of interrupt latency generally improves the overall network processing of the computer system 102. During higher traffic conditions, multiple packets are often received in parallel from multiple devices. During such higher, parallel traffic conditions, early interrupts may have a negative impact on efficiency. One solution is to provide a mechanism to manually enable or disable early interrupts. With such a manual mechanism, a network administrator has the option to enable early interrupts if slower network traffic conditions are contemplated, or to disable early interrupts if higher network traffic conditions are contemplated. Simply enabling or disabling early interrupts may cause inefficiency for many networks during some operating periods. There are both benefits and hindrances during network operations for both situations in which early interrupts are enabled or disabled.

Figure 5:
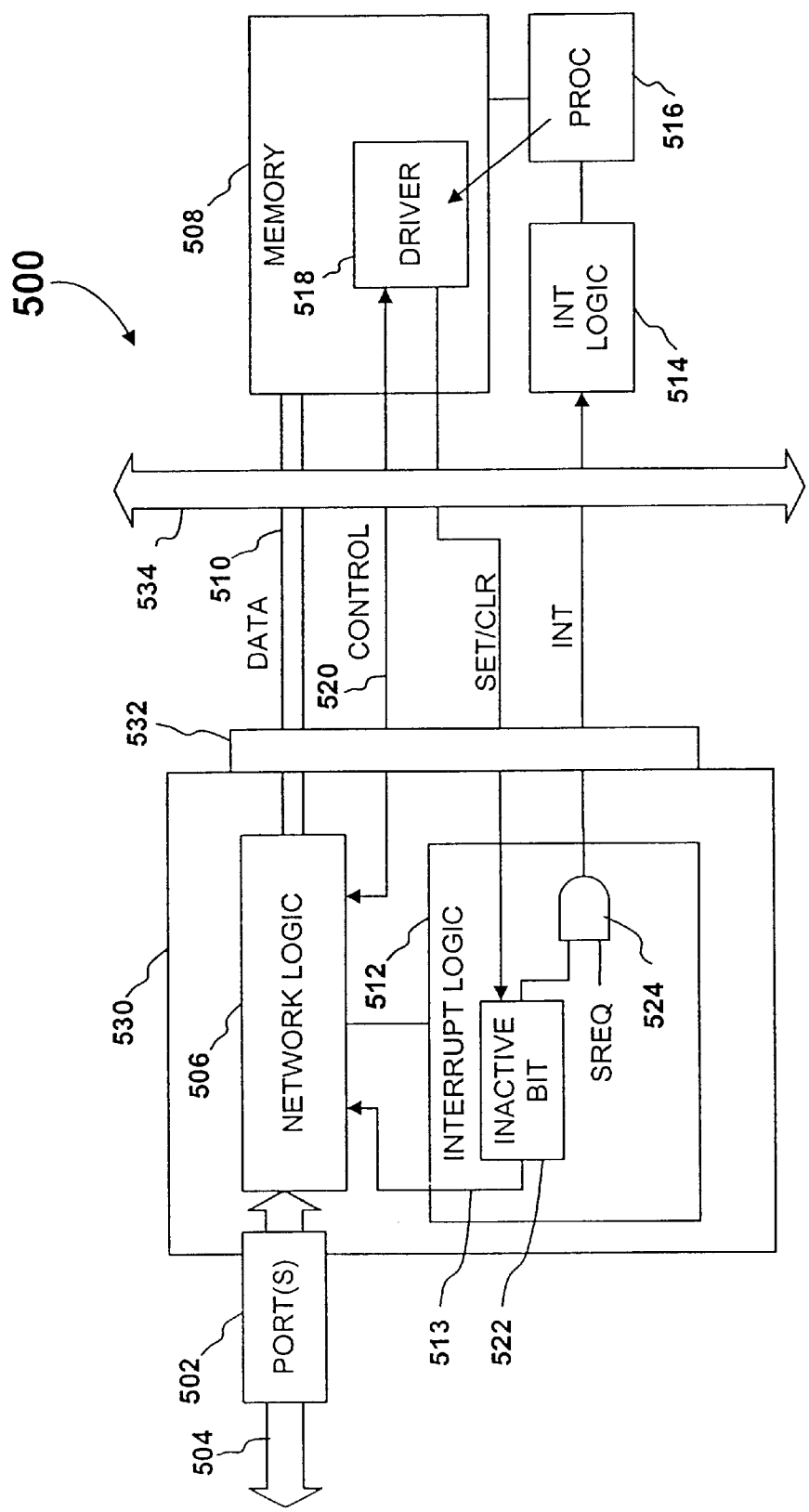
FIG. 5 is a block diagram of a network controller system incorporating a service request system implemented according to one embodiment of the present invention.

FIG. 5 is a block diagram of a network controller system 500 including a network adapter 530 and incorporating a service request system implemented according to one embodiment of the present invention. The functions and/or logic of the network adapter 530 described herein may be implemented on NIC 260 of FIG. 3. One or more ports 502 couple a corresponding one or more network links 504 to network logic 506 on the network adapter 530. The network logic 506 performs any network function including those requiring further processing when completed. One such function that the network logic 506 performs is transfer of data between the ports 502 and a memory 508 via a data bus 510. Interrupt logic 512 associated with the network logic 506 asserts an interrupt signal (INT) to system interrupt logic 514 to request service for the network logic 506. The interrupt logic 514 may be incorporated within the APICs 252, although any type of logic for intercepting interrupts is contemplated. The interrupt logic 514 informs a processor 516 that an interrupt has occurred, which responds by executing a driver (or any other type of ISR) 518 from the memory 508. The driver 518 may already be resident within the memory 518 or may be loaded into the memory 518 for execution by the processor 516 in response to the interrupt. The driver 518 corresponds to the network adapter 530 and is particularly configured to handle the interrupts generated by the interrupt logic 512. The driver 518, while being executed by the processor 516, services the network logic 506 via one or more control signals 520.

In the embodiment shown, the interrupt logic 512 includes an activity or inactive bit 522 that is controlled by the driver 518 via a set/clear (SET/CLR) signal. The inactive bit 522 is provided to one input of inhibit logic 524, which receives a service request signal SREQ that is internal to the interrupt logic 512. The external interrupt signal TNT is asserted by the inhibit logic 524 in response to an assertion of the SREQ signal only if the inactive bit 522 indicates that external interrupts are allowed or are otherwise activated. The inhibit logic 524 is shown as a logic AND gate that asserts the interrupt INT signal if the SREQ signal and the inactive bit 522 are logic one or high. The AND gate is a simple version of the inhibit logic 524 illustrating the basic logic function, but may be implemented in any desired manner and may include other logic depending upon the particular configuration. In one embodiment, the driver 518 clears the inactive bit 522 upon execution or startup, such as when executed by the processor 516, to generally indicate that the driver 518 is active (not inactive) and servicing the network logic 506. When the inactive bit 522 is cleared, further service requests by the network logic 506 via the SREQ signal are inhibited by the inhibit logic 524. Thus, the INT signal is not asserted while the inactive bit 522 is cleared.

The driver 518 services the network logic 506 via the control lines 520 in response to the assertion of the INT signal. For example, the driver 518 may acknowledge the receipt of a network packet by the network logic 506 from the one or more network links 504. The driver 518 may handle any desired events of the network logic 506 that occur during execution. For example, the network logic 506 may receive one or more subsequent packets from the network links 504 while the driver 518 is acknowledging reception of a prior packet, where the driver 518 further acknowledges the subsequent packets as well during the current service session. For example, the driver 518 may acknowledge new packets that are received while the driver 518 is executing. In one embodiment, the driver 518 detects subsequent assertions of the SREQ signal, or otherwise polls the network logic 506 for all serviceable events, and then handles or otherwise responds to all serviceable events in addition to the original event that caused execution of the driver 518. It is noted, however, that the network logic 506 could consume more processing time than desired while the driver 518 is servicing the network logic 506. It is conceivable that the driver 518 could be executed for an indefinite period of time while handling all serviceable events of the network logic 506 if not otherwise limited. In another embodiment, a time limit or the like may be used to prevent the driver 518 from being executed for an extended period of time.

The driver 518 sets the inactivity bit 522 prior to exiting, thereby indicating that the driver 518 is again inactive. In this manner, a subsequent interrupt from the interrupt logic 512 is not inhibited by the inhibit logic 524. Thus, the network logic 506 may once again request servicing by the driver 518. The use of the inactive bit 522 and the inhibit logic 524 prevent another interrupt to the processor 516 while executing the driver 518. This prevents the processor 516 from wasting valuable processing time responding to redundant service requests by the network logic 506 via the interrupt logic 512. In this case, a subsequent service request by the network logic 506 is "redundant" in that there is no need to invoke the driver 516 again as it is already executing and servicing the network logic 506. In another embodiment, the network logic 506 detects that the inactive bit 522 is cleared, such as via signal line 513, and stops requesting service or otherwise causing further interrupts to be asserted while the inactive bit 522 remains cleared. Further, the network logic 506 may change its operating behavior into a more streamlined mode based on the fact that the driver 518 is executing. At least the network logic 506 need not spend time requesting service while the driver 518 is executing.

The network controller system 500 illustrated corresponds with the computer system 102, where the port(s) 502, the network logic 506 and the interrupt logic 512 are implemented on the network adapter 530, similar to the NIC 260. The network adapter 530 includes a compatible connector 532 for coupling to an appropriate bus system 534 of a computer system. The bus system 534 may represent the various buses of the computer system 102, including the PCI buses 216, 212, the host bus 208, the expansion bus 228 and the X-bus 234, as well as the corresponding bridges 214, 210, 226 and buffers 232. The processor 516 corresponds to the CPU 202, the memory 508 corresponds to the system memory 206 and the driver 518 represents the NIC driver 414. The network logic 506 may incorporate one or more of the bus I/F 302, the TX logic 304, the TX FIFO 306, the TX data control 308, the RX logic 314, the RX FIFO 312, the RX data control 310, the DMA logic 316, the registers 318 and the control circuitry 322, among other logic and circuitry as desired.

It is noted that the network logic 506 may perform functions other than transmitting and receiving data and handling data transfers to and from the memory 508, such as receiving and executing commands from the driver 518. The interrupt logic 512 may assert the INT signal to report to the driver 518 that a command is completed. The network logic 506 may collect and monitor network statistics, and the interrupt logic 512 may be used to inform the driver 518 of important statistical changes.

Figure 6:
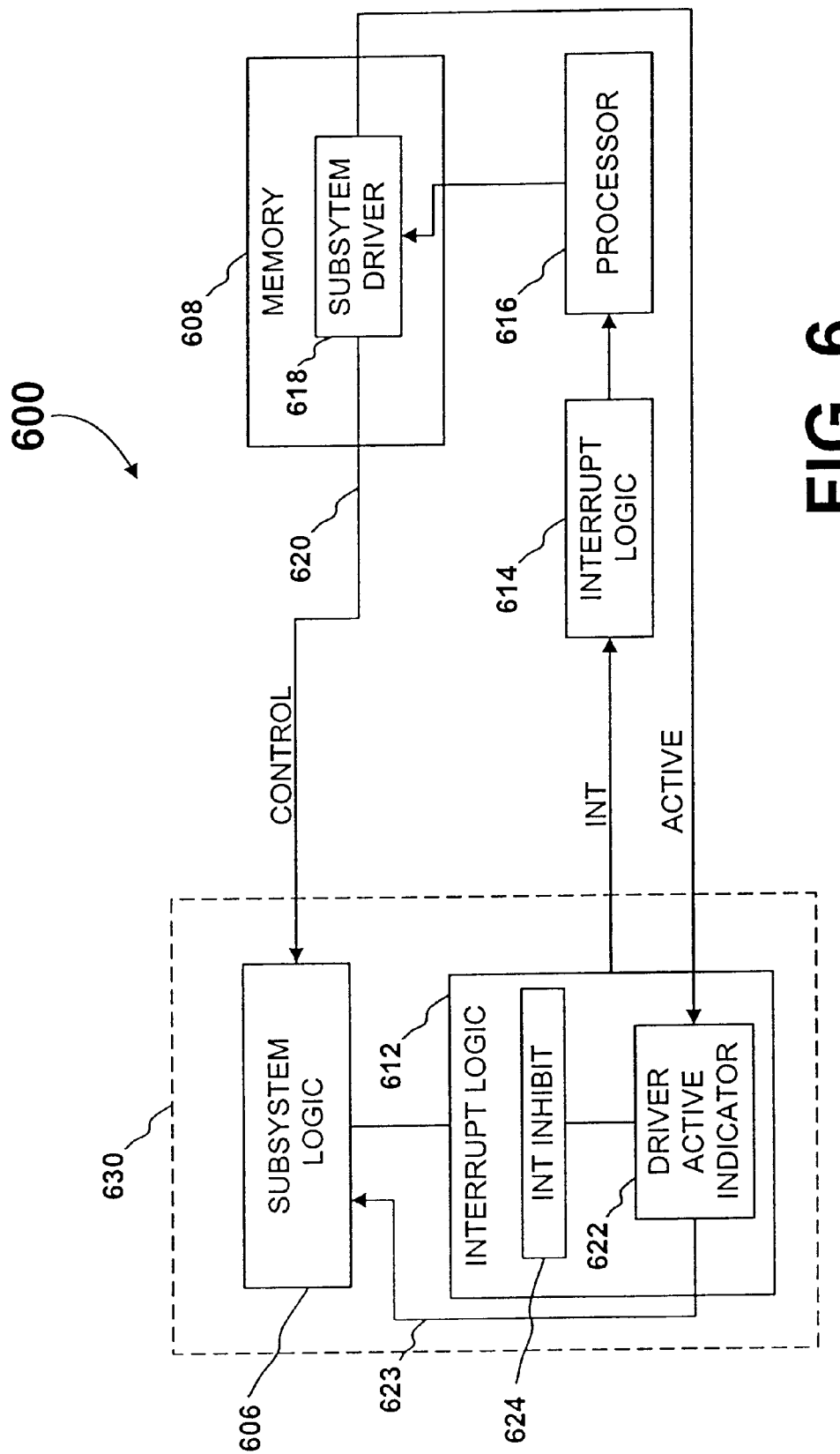
FIG. 6 is a block diagram of a computer system including a subsystem and a service request system implemented according to another embodiment of the present invention.

FIG. 6 is a block diagram of a computer system 600 including a subsystem 630, illustrating another embodiment of the present invention. A memory 608, a subsystem driver 618, interrupt logic 614 and a processor 616 are shown in a similar manner as the memory 508, the driver 518, the interrupt logic 514 and the processor 516 of the network controller system 500. The subsystem 630 is implemented to perform any desired function of a computer system and is not limited to network systems. For example, the subsystem logic 606 may comprise any type of communication system, such as analog or digital modems, network cards, adapter cards, sound systems and sound cards, video systems and video cards, as well as any other type of computer subsystem, such as those involving data transfer systems, disk controllers, internal or external data transfers, etc. The subsystem logic 606 may be implemented within the primary portion of a computer system, such as on the motherboard, or may be implemented on an expansion card plugged into a peripheral or expansion bus of a computer.

The subsystem 630 includes or is otherwise associated with interrupt logic 612 coupled to the subsystem logic 606. The interrupt logic 612 asserts an interrupt signal INT to the interrupt logic 614, in a similar manner as described previously, in response to a service request by the subsystem logic 606. The interrupt logic 614 causes an interrupt to the processor 616 and also informs the processor 616 of the source of the interrupt, where the processor 616 responds by executing the subsystem driver 618 from the memory 608. The subsystem driver 618 is implemented to service the subsystem logic 606 via control signals 620.

The interrupt logic 612 includes a driver active indicator 622 coupled to inhibit logic 624. The interrupt logic 612 asserts the INT signal as long as not inhibited by the inhibit logic 624. The inhibit logic 624 inhibits the INT signal from being asserted if the driver active indicator 622 indicates that the subsystem driver 618 is running or being executed by the processor 616. The subsystem driver 618 controls the driver active indicator 622 via an ACTIVE signal to inform the subsystem 630 that it is executing. In particular, upon execution by the processor 616, the subsystem driver 618 controls the driver active indicator 622 to indicate that it is active and running. The interrupt inhibit logic 624 detects that the subsystem driver 618 is executing via the driver active indicator 622, and prevents further assertions of the INT signal. The subsystem driver 618 services one or more serviceable events of the subsystem logic 606 during execution, and then exits. Prior to exiting, the subsystem driver 618 causes the driver active indicator 622 to indicate that the subsystem driver 618 is no longer active. While the inhibit logic 624 detects that the subsystem driver 618 is not running or is not active via the driver active indicator 622, the inhibit logic 624 enables the interrupt logic 612 to assert the INT signal in response to service requests by the subsystem logic 606. In this manner, redundant interrupts by the subsystem 630 are avoided.

In one embodiment, a signal line 623 is included so that the subsystem logic 606 detects that the subsystem driver 618 is executing via the driver active indicator 622. In this case, the subsystem logic 606 may operate in a more streamlined mode or otherwise change its operational behavior based on the fact that the subsystem driver 618 is in control of the processor 616. For example, the subsystem logic 606 may at least suppress further service requests until the driver active indicator 622 indicates that the subsystem driver 618 is no longer controlling the processor 616. It is noted that many variations are contemplated and that the present invention is not limited to the specific embodiments described herein. For example, the inhibit logic 624 or the driver active indicator 622 or both may be implemented external to the interrupt logic 612 or external to the subsystem 630. Also, interrupts from the subsystem 630 may be provided directly to the processor 616 depending upon the particular implementation.

It is now appreciated that a system and method using an activity indicator to reduce processing overhead according to the present invention reduces process overhead associated with redundant interrupts and/or service requests. A system and method according to the present invention is advantageous for any computer in which a subsystem may potentially assert an interrupt while its own driver or interrupt service routine is already in control of the system processor. The driver associated with a subsystem handles one or more serviceable functions or events while in control of the system processor, so that the processor need not spend valuable processing time responding to any redundant interrupts or requests. Such redundant requests are avoided, thereby improving overall system efficiency by eliminating unnecessary process overhead.

A network controller system with interrupt inhibits according to the present invention improves network processing between a network adapter or NIC and its host computer by eliminating redundant interrupts from the NIC. Such a network controller system is particularly useful on network server systems. Data flow between the network adapter and host computer memory, for example, is processed much more quickly, thereby significantly increasing bandwidth and improving network traffic flow.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system, comprising:
   a processor;
   a subsystem coupled to the processor by way of peripheral interface, the subsystem comprising a subsystem logic coupled to a first interrupt logic, wherein the subsystem logic generates a request for service, and wherein the first interrupt logic generates an interrupt to the processor in response to the request for service; and
   a driver that is executed by the processor in response to an interrupt from the subsystem;
   wherein the subsystem logic is operable to refrain from generating a request for service when the driver is executing.

2. The computer system of claim 1 further comprising:
   a second interrupt logic coupled to the processor and the first interrupt logic, the second interrupt logic interrupts the processor for each interrupt received and informs the processor of the source of each received interrupt.

3. The computer system of claim 1 wherein the subsystem further comprising:
   an activity indicator that indicates whether the driver is being executed; and
   wherein the subsystem logic refrains from generating further requests for service when the activity indicator indicates the driver is being executed.

4. The computer system of claim 3 further comprising:
   the activity indicator comprising a logic bit that indicates whether the driver is executing.

5. The computer system of claim 4 wherein the driver changes the state of the logic bit upon execution to a first state and changes the state of the logic bit to a second state upon exiting.

6. The computer system of claim 4, the logic bit comprising an inactive bit, wherein the driver clears the inactive bit upon execution and sets the inactive bit upon exiting.

7. A computer system, comprising:
   at least one peripheral bus;
   a processor coupled to the at least one peripheral bus;
   a subsystem coupled to the processor, comprising
      subsystem logic that requests service from the processor; and
      first interrupt logic, coupled to the subsystem logic, that asserts an interrupt in response to a service request from the subsystem logic; and
   a subsystem driver that is executed by the processor in response to an interrupt from the first interrupt logic, the subsystem driver configures the subsystem logic to not generate service requests while the subsystem driver is executing.

8. The computer system of claim 7 wherein the subsystem is coupled to the processor via the peripheral bus.

9. The computer system of claim 8 further comprising:
   the subsystem implemented on a network interface card (NIC) that is plugged into a slot of the peripheral bus;
   the subsystem logic comprising network logic on the NIC that performs network functions for coupling the computer system to a network; and
   the driver comprising a NIC driver.

10. The computer system of claim 7 further comprising:
    second interrupt logic that receives interrupts for the processor, that interrupts the processor for each interrupt received and that informs the processor of the source of each received interrupt.

11. A computer system including a subsystem that requests processing service, comprising:
    means for processing;
    driver means, coupled to the means for processing and the subsystem, that services the subsystem when executed by the means for processing in response to an interrupt;
    means for asserting interrupts that detects service requests from a means for asserting a service request and that asserts an interrupt to the means for processing for each service request detected; and
    wherein the means for asserting a service request suppresses assertion of service requests when the driver means is executed by the means for processing.

12. The computer system of claim 11 further comprising:
    means for storing data; and
    the driver means comprising executable code that is loaded into the means for storing data for execution by the means for processing to service a service request.

13. The computer system of claim 11 further comprising:
    a means for indicating comprising a logic bit that indicates whether the driver means is being executed by the means for processing; and the driver means, when executed by the means for processing changing the state of the logic bit to a first logic state upon execution and changing the state of the logic bit to a second logic state upon exiting execution.

14. The computer system of claim 11, wherein the means for asserting a service request suppresses requesting service if the means for indicating indicates that the driver means is being executed by the means for processing.

15. A computer system, comprising:

at least one peripheral bus;

means for processing coupled to the at least one peripheral bus;

a subsystem, comprising
   means for requesting service from the means for processing; and
   means for asserting interrupts, coupled to the means for requesting service, for asserting an interrupt in response to a service request from the means for requesting service;
   driver means that is executed by the means for processing to service the subsystem; and
   means for configuring the subsystem coupled to the driver means, wherein the means for configuring the subsystem configures the means for requesting to not generate a service request while the driver means is executed.

16. The computer system of claim 15, further comprising:

a means for indicating that the driver means is being executed, the means for indicating comprising a logic bit; and the driver means changing the logic bit to a first state during initial execution and changing the logic bit to a second state prior to exiting execution.

17. A method of handling service requests for a processor of a computer, comprising:

detecting a service request generated by a subsystem logic;

asserting a corresponding interrupt in response to the service request;

executing a driver in response to an interrupt;

controlling, by the driver, an activity indicator that when asserted causes the subsystem logic that asserted the service request to suppress further service requests while the driver is being executed.

18. The method of claim 17, further comprising:

selectively requesting service, by the subsystem logic, based on the status of the activity indicator.

\* \* \* \* \*